(12) United States Patent
Allinson et al.

(10) Patent No.: US 9,754,002 B2
(45) Date of Patent: Sep. 5, 2017

(54) METHOD AND SYSTEM FOR PROVIDING A SYNCHRONIZATION SERVICE

(71) Applicant: EXCALIBUR IP, LLC, Sunnyvale, CA (US)

(72) Inventors: Ric Allinson, Sunnyvale, CA (US); Fanyi Zeng, Beijing (CN)

(73) Assignee: EXCALIBUR IP, LLC, New York, NY (US)

( * ) Notice: Subject to any disclaimer, the term of this patent is extended or adjusted under 35 U.S.C. 154(b) by 281 days.

(21) Appl. No.: 14/508,434

(22) Filed: Oct. 7, 2014

(65) Prior Publication Data

US 2016/0098469 A1    Apr. 7, 2016

(51) Int. Cl.
*G06F 17/30* (2006.01)

(52) U.S. Cl.
CPC .. *G06F 17/30575* (2013.01); *G06F 17/30174* (2013.01); *G06F 17/3023* (2013.01); *G06F 17/30088* (2013.01); *G06F 17/30194* (2013.01); *G06F 17/30371* (2013.01)

(58) Field of Classification Search
CPC ......... G06F 17/30575; G06F 17/30377; G06F 17/303; G06F 17/30578; G06F 17/30368; G06F 17/30174; G06F 17/30088; G06F 17/30194; G06F 17/3023; G06F 17/30371
USPC ....... 707/610, 615, 622, 625, 803, 612, 616, 707/620, 624, 690
See application file for complete search history.

(56) References Cited

U.S. PATENT DOCUMENTS

| | | | |
|---|---|---|---|
| 7,895,666 B1* | 2/2011 | Eshghi | G06F 17/30958 705/25 |
| 8,073,976 B2* | 12/2011 | Marucheck | G06F 1/14 709/223 |
| 8,995,472 B2* | 3/2015 | Haba | H04J 3/0661 370/510 |
| 9,405,654 B2* | 8/2016 | Ravindranath Sivalingam | G06F 11/3476 |
| 9,436,502 B2* | 9/2016 | Burckhardt | G06F 9/466 |
| 2014/0259005 A1* | 9/2014 | Jeffrey | G06F 8/65 717/173 |
| 2015/0120663 A1* | 4/2015 | Le Scouarnec | H04L 67/10 707/638 |
| 2015/0370827 A1* | 12/2015 | Parkison | G06F 17/30215 707/626 |
| 2015/0379100 A1* | 12/2015 | Vermeulen | G06F 17/30575 707/620 |

* cited by examiner

*Primary Examiner* — Dangelino Gortayo
(74) *Attorney, Agent, or Firm* — James J. DeCarlo; Greenberg Traurig, LLP

(57) ABSTRACT

Disclosed herein is a data synchronization between a client computing device's local store and another data store, such as a data store that is remote to the client computing device. The other data store may comprise a cloud data store. The existence, or absence, of a causal relationship between the local and remote data stores for a given data item is used to determine whether or not a conflict exists and/or whether a requested operation may be performed. The causal relationship may be determined using a previous commit's hash value, referred to as a hash_base value, and a hash value, both of which are associated with the data item.

24 Claims, 13 Drawing Sheets

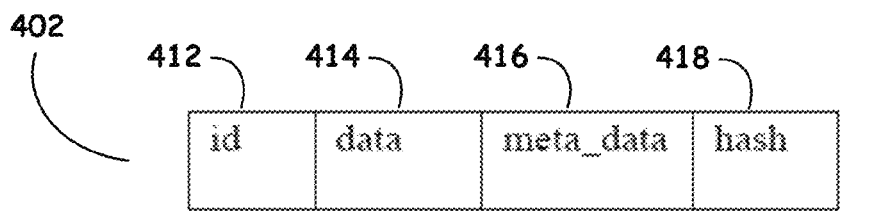
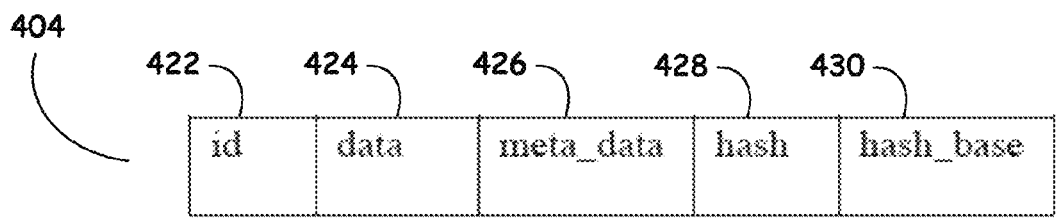
Fig. 4
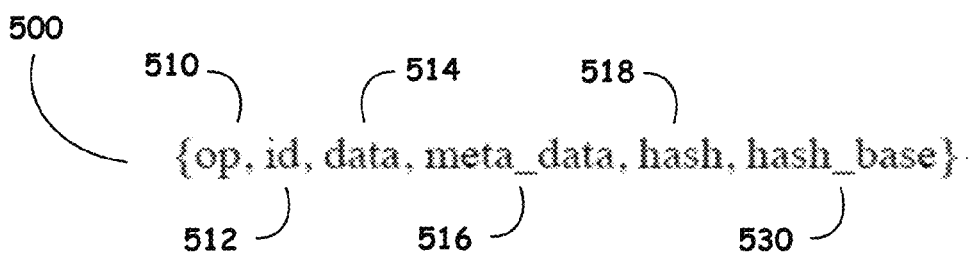
Fig. 5
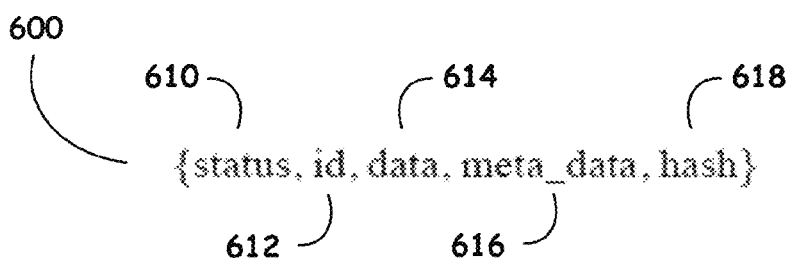
Fig. 6

1. For each request i do
2.    Read record j from cloud with id ==i.id;
3.    SWITCH (i.op)
4.      CASE "update":
5.        IF i.hash_base == j.hash
6.          Write record {i.id, i.data, i.meta_data, i.hash} to cloud storage;
7.          Response ("write", i.id) to client;
8.        ELSE
9.          Response ("conflict", j.id, j.data, j.meta_data, j.hash) to client;
10.        BREAK;
11.      CASE "read":
12.        IF i.hash != j.hash
13.          Response { "read", j.id, j.data, j.meta_data, j.hash } for client;
14.        BREAK;
15.    END SWITCH
16. END FOR

*Fig. 8*

1. For each record i in local storage do
2.     IF i.hash != i.hash_base
3.         Send request {"update", i.id, i.data, i.meta_data, i.hash, i.hash_base} to server;
4.     ELSE
5.         Send request {"read", i.id} to server;
6. END FOR

*Fig. 11*

1. For each response i do
2.     Read record j from local storage with id==i.id;
3.     IF i.status == "write"
4.         j.hash_base = j.hash;
5.         Write record j to local storage;
6.     ELSE IF i.status == "read"
7.         j.data = i.data;
8.         j.meta_data = i.meta_data;
9.         j.hash = i.hash;
10.        j.hash_base = i.hash;
11.        Write record j to local storage;
12.     ELSE IF i.status == "conflict"
13.        Call conflicts resolving function to choose between {i.id, i.data, i.meta_data, i.hash} and {j.id, j.data, j.meta_data, j.hash};
14.        Get resolved record {r.id, r.data, r.meta_data, r.hash} from conflicts resolving function;
15.        j.data = r.data;
16.        j.meta_data = r.meta_data;
17.        j.hash = r.hash;
18.        j.hash_base = i.hash;
19.        Write record j to local storage;
20.     ELSE
21.        Do error handling;
22. END FOR

*Fig. 12*

METHOD AND SYSTEM FOR PROVIDING A SYNCHRONIZATION SERVICE

FIELD OF THE DISCLOSURE

The present disclosure relates to data synchronization across multiple data consuming devices, or data computing devices, and relates to data synchronization capability for use with existing data consuming systems.

BACKGROUND

A user typically uses multiple computing devices up any of which may be used to operate on data. Where the same data is being operated on using multiple different computing devices, the data must be synchronized between the multiple computing devices. Otherwise and for example, any changes to data made by the user using one computing device is unavailable to the user when the user attempts to access the changes using a different computing device.

One approach that might be used is to use a central storage server and require that each computing device read and write to the central storage; however, there are several problems associated with such approach. For example, each computing device must be connected to the server in order to read and/or write to the central storage, which does not provide for a computing device being offline. Even where all of the computing devices are online, conflicts may occur when different devices attempt to access the same data simultaneously.

SUMMARY

The present disclosure seeks to address failings in the art and to provide a data synchronization service. In accordance with one or more embodiments, an intermediary, e.g. a synchronization server, which may act as a proxy, is positioned between a centralized, and/or remote, data store, e.g., an existing data store without synchronization capabilities, and a local data store(s) associated with each client computing device. The synchronization service, which may be provided by one or more synchronization servers, may provide data synchronization capability. By virtue of this arrangement, for example, synchronization operations need not be provided by either the remote data store(s) or the client computing device(s).

In accordance with at least one embodiment, causality-based data synchronization may be used, which ensures causal order without requiring versioning support from a data store, such as a cloud data store. In accordance with one or more embodiments, data, e.g., client data, may be used to update a direct causal ancestor of the data, e.g., data stored in a data store accessible by one or more client computing devices such as a cloud data store. In accordance with one or more embodiments, a direct causal ancestor may be determined between a first data value, e.g., a first data value stored in a data store such as a cloud data store, and a second data value, e.g., a second data value from a client device, intended to be used to replace, or overwrite, the first data value using synchronization values associated with each of the first and second data values. By way of a non-limiting example, the first and second data values each have a synchronization value, such as a hash value determined using at least the respective data value. In addition to its hash value, the second data value has a synchronization base value, which is also referred to herein as a hash_base value, corresponding to its direct causal ancestor.

In accordance with one or more embodiments, the synchronization base value identifies a link, or relationship, between first and second data, which may be established when one of the first and second data is retrieved from storage. In accordance with one or more embodiments, assuming that the first data was retrieved from storage and the second data was generated from the first data, before the second data is used to overwrite the first data, the second data's hash_base value is compared with the first data's hash to determine whether the first data is a direct causal ancestor to the second data value. By way of a non-limiting example, the direct causal ancestor relationship may exist if no other request to overwrite the first data, e.g., with third data, before the attempt to overwrite the first data with the second data. If the third data successfully overwrites the first data before the attempt to overwrite the first data with the second data, the data store stores the third data in place of the first data, and there is no direct causal relationship between the second and third data. Stored data, such as the first data, may have an associated synchronization value, referred to herein as a hash value. Data, such as the second and third data, that may be used overwrite stored data, may have both a synchronization value, such as a hash value, and a synchronization base value, such as a hash_base value. If a comparison of the first data's synchronization value and the second data's synchronization base value yields a determination that the first data is a direct causal ancestor of the second data, such as in the case that the second data's hash_base value and the first data's hash match, e.g., are the same or equal, then the second data may be used to overwrite the first data in the data store, and the second data's hash may overwrite the first data's hash. When the value of a data item stored in the data store is retrieved, e.g., by a client device, the data item's hash value is retrieved along with the data item's data value, and the retrieved hash may be used as the hash_base value for the retrieved data item, which hash_base value may be used to determine the existence of a direct causal relationship between the retrieved data item and a stored data item.

In accordance with one or more aspects of the disclosure, a method is provided, the method comprising receiving, by at least one synchronization server computer configured to provide data synchronization for at least one data storage system, a request to perform a data storage operation in connection with the at least one data storage system, the request having associated information comprising a data identifier and a synchronization value; retrieving, by the synchronization server computer from a data store of the at least one data storage system, the data store's synchronization value using the request's data identifier; comparing the request's synchronization value and data store's synchronization value to make a determination whether the data store's data identified by the request's data identifier is a direct causal ancestor of data associated with the request; and determining, by the synchronization server computer, whether to permit the at least one data storage system to make the requested data storage operation based on the determination.

In accordance with at least one aspects of the disclosure, a method is provided comprising transmitting, by a client computing device to a synchronization server computer, an update request to overwrite at least one data value of a data store of at least one data storage system with the request's at least one updated data value, the update request comprising a synchronization value for the request's at least one updated data value, a synchronization base value for the direct causal ancestor of the request's at least one updated data value and a data identifier for use in retrieving a synchronization value associated with the data store's at least one data value, the request's synchronization base value and data store's synchronization value for use in making a determination whether or not the data store's at least one data value identified by the request's data identifier is the direct causal ancestor of the request's at least one updated data value; receiving, by the client computing device, a response to the write request, the response indicating that a conflict exists because the data store's at least one data value is not a direct causal ancestor of the request's at least one updated data value, the response further comprising data store's at least one data value; and identifying, by the at least one computing device, a selection of one of the data store's at least one data value and the request's at least one updated data value to resolve the conflict.

A system of the present disclosure comprises a processor of a synchronization server computer; a storage medium for tangibly storing thereon program logic for execution by the processor, the stored program logic comprising receiving logic executed by the processor for receiving a request for at least one data storage system to perform a data storage operation in connection with the at least one data storage system, the request having associated information comprising a data identifier and a synchronization value; retrieving logic executed by the processor for retrieving from a data store of the at least one data storage system, the data store's synchronization value using the request's data identifier, comparing logic executed by the processor for comparing the request's synchronization value and the data store's synchronization value to make a determination whether the data store's data identified by the request's data identifier is a direct causal ancestor of data associated with the request; and determining logic executed by the processor for determining whether to permit the at least one data storage system to make the requested data storage operation based on the determination.

According to one or more further aspects of the disclosure, a system is provided comprising a processor of a client computing device; a storage medium for tangibly storing thereon program logic for execution by the processor, the stored program logic comprising transmitting logic executed by the processor for transmitting, to a synchronization server computer, an update request to overwrite at least one data value of a data store of at least one data storage system with the request's at least one updated data value, the update request comprising a synchronization value for the request's at least one updated data value, a synchronization base value for the direct causal ancestor of the request's at least one updated data value and a data identifier for use in retrieving a synchronization value associated with the data store's at least one data value, the request's synchronization base value and data store's synchronization value for use in making a determination whether or not the data store's at least one data value identified by the request's data identifier is the direct causal ancestor of the request's at least one updated data value; receiving logic executed by the processor for receiving a response to the write request, the response indicating that a conflict exists because the data store's at least one data value is not a direct causal ancestor of the request's at least one updated data value, the response further comprising data store's at least one data value; and identifying logic executed by the processor for identifying a selection of one of the data store's at least one data value and the request's at least one updated data value to resolve the conflict.

In accordance with yet another aspect of the disclosure, a computer readable non-transitory storage medium is disclosed for tangibly storing thereon computer readable instructions that when executed cause at least one processor to provide a synchronization service to at least one data storage system, the computer readable instructions comprising instructions to receive a request to perform a data storage operation in connection with the at least one data storage system, the request having associated information comprising a data identifier and a synchronization value; retrieve, from a data store of the at least one data storage system, the data store's synchronization value using the request's data identifier; compare the request's synchronization value and data store's synchronization value to make a determination whether the data store's data identified by the request's data identifier is a direct causal ancestor of data associated with the request; and determine whether to permit the at least one data storage system to make the requested data storage operation based on the determination.

In yet another aspect, a computer readable non-transitory storage medium is disclosed for tangibly storing thereon computer readable instructions that when executed cause at least one processor to transmit, to a synchronization service, an update request to overwrite at least one data value of a data store of at least one data storage system with the request's at least one updated data value, the update request comprising a synchronization value for the request's at least one updated data value, a synchronization base value for the direct causal ancestor of the request's at least one updated data value and a data identifier for use in retrieving a synchronization value associated with the data store's at least one data value, the request's synchronization base value and data store's synchronization value for use in making a determination whether or not the data store's at least one data value identified by the request's data identifier is the direct causal ancestor of the request's at least one updated data value; receive a response to the write request, the response indicating that a conflict exists because the data store's at least one data value is not a direct causal ancestor of the request's at least one updated data value, the response further comprising data store's at least one data value; and identify a selection of one of the data store's at least one data value and the request's at least one updated data value to resolve the conflict.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 illustrates an example topology comprising components that may be used in accordance with one or more embodiments of the present disclosure.

FIG. 2, which comprises FIGS. 2A and 2B, provides direct causal relationship examples in accordance with one or more embodiments of the present disclosure.

FIG. 3 provides an example of a conflict occurring where a causal relationship is determined to be nonexistent between two values in accordance with one or more embodiments of the present disclosure.

FIG. 4 provides data schema examples for a data store and a client store in accordance with one or more embodiments of the present disclosure.

FIG. 5 provides examples of fields that may be included in a client request in accordance with one or more embodiments of the present disclosure.

FIG. 6 provides examples of fields that may be included in a response to a client request in accordance with one or more embodiments of the present disclosure.

FIG. 7, which comprises FIGS. 7A and 7B, provides an example of a synchronization process flow in accordance with one or more embodiments of the present disclosure.

FIG. 8 provides an example of pseudocode corresponding to the process flow of FIG. 7, which further illustrates a synchronization process in accordance with one or more embodiments of the present disclosure.

FIG. 9 provides an example of request generation process flow in accordance with one or more embodiments of the present disclosure.

FIG. 10, which comprises FIGS. 10A and 10B, provides an example of a request response handling process flow in accordance with one or more embodiments of the present disclosure.

FIGS. 11 and 12 provide examples of pseudocode corresponding to the process flows of FIGS. 9 and 10.

DETAILED DESCRIPTION

Figure 1:
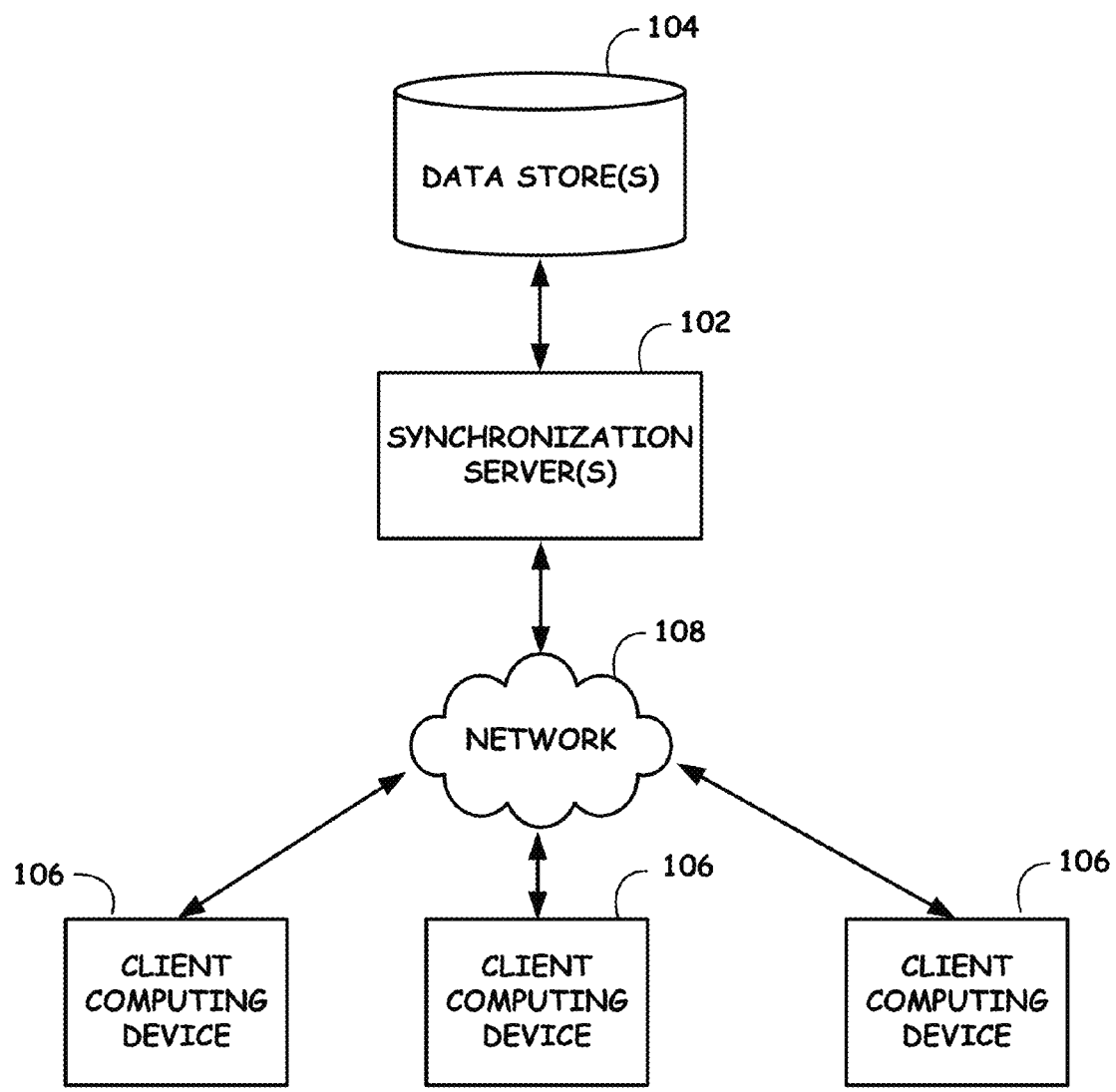

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a synchronization proxy service system, method and architecture. In accordance with one or more embodiments, a causality-based data synchronization approach is used. In accordance with at least one such embodiment, versioning support from a data store, e.g., cloud storage, may be avoided while still ensuring that data overwriting maintains causal order. Conflict detection computation, e.g., at the server side, may be minimized; synchronization service may be easily scaled. Synchronization provided in accordance with one or more embodiments may be used with different data stores, such as and without limitation cloud data stores, data stores that lack synchronization capability, and the like.

FIG. 1 illustrates an example topology comprising components that may be used in accordance with one or more embodiments of the present disclosure. In the example topology, or arrangement, of components provided in FIG. 1, client data, including data exchanged between multiple clients, may be synchronized. In the example, each client computing device 106 may comprise a data store which is local to the client computing device 106. Each client computing device 106 may be operating on data that is stored both locally and at another one or more data stores that may be remote to the client computing device 106. By way of a non-limiting example, data may be stored locally at the client computing device 106 and at one or more other data store(s) 104. Data store(s) 104, which may be remote to the client computing device(s) 106, may be used to store data retrievable by one or more of the client computing device(s) 106. By way of a non-limiting example, each data store(s) 104 may comprise a server computer coupled to data storage. By way of a further non-limiting example, one or more of data store(s) 104 may provide cloud data storage for the client computing device(s) 106.

Data store(s) 104 may store data such as and without limitation messages, including such messages as electronic messages, text messages, short messages, etc., contracts, profile data, content, such as documents, articles, audio, video, multimedia, etc., social networking posts, blogs posts, etc. It should be apparent that data stored in the data store(s) 104 may be any type of data. While embodiments of the present disclosure are described herein using an example of a data value, e.g., a data value of a data item, it should be apparent that the data value may be any type of data, including without limitation the examples of data provided herein. Data store(s) 104 may be a data storage system's component(s), which data storage system may comprise one or more data storage server computing systems.

Each client computing device 106 may be communicatively connected to a network 108, which may comprise a local area network (LAN), wide area network (WAN), the internet, etc. Each client computing device 106 may access data stored at data store(s) 104 via the network 108. In accordance with one or more embodiments, one or more synchronization server(s) 102 may be used to synchronize data stored at the data store(s) 104 and the client computing device(s) 106. Synchronization server(s) 102 may be integrated with one or more of the data store(s) 104. Alternatively, the synchronization server(s) 102 may be a separate component from the data store(s) 104 and the client computing device(s) 106. In the latter case, synchronization of data may be provided in connection with a data store(s) 104 that does not have synchronization capability.

In accordance with one or more embodiments, the synchronization server(s) 102 may be used to determine whether or not a data conflict exists in connection with a data item that resides at a local data store of one or more of the client computing device(s) 106 and the data store(s) 104. In accordance with one or more such embodiments, the synchronization server(s) 102 may use a causality, or causal relationship, among local and remote data to determine whether or not a data conflict exists.

In accordance with one or more embodiments, causality may be used herein to refer to a relationship between two values x and y, e.g., two values of a data item, or record. In accordance with one or more such embodiments, conflicts may be defined, and resolved, based on such causality. By way of a non-limiting example, if a value y is based on a value x, value x may be said to be the cause and value y may be said to be the effect. By way of a non-limiting example, a data item having the value x may be updated, which update may result in the data item having the value y. In such a relationship, the value y may be used to overwrite one or more occurrences of the value x.

Figure 2A:
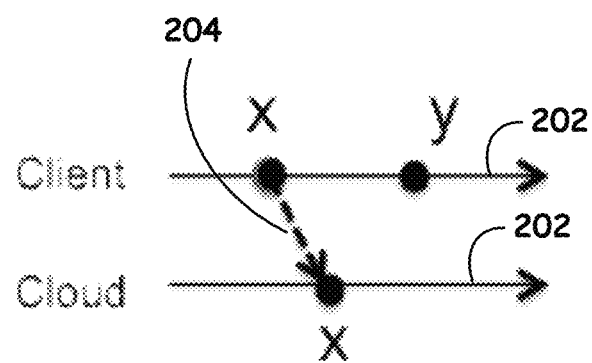
Figure 2B:
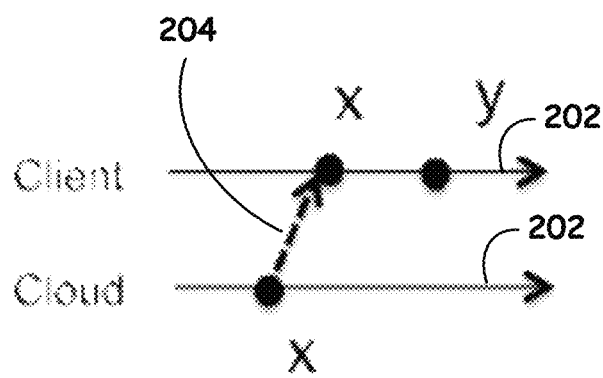

FIG. 2, which comprises FIGS. 2A and 2B, provides direct causal relationship examples in accordance with one or more embodiments of the present disclosure. In the non-limiting example provided in FIGS. 2A and 2B, there is a direct causal relationship between values x and y. In the examples of FIGS. 2A and 2B, "client" may correspond to one of the client computing devices(s) 106 and "cloud" may correspond to one or more of the data store(s) 104. In the example shown in FIGS. 2A and 2B, solid lines 202 represent a timeline showing elapsed time, and dotted line 204 represents a data transmission between a client and the data store. In the example of FIG. 2A, value x is being written to the cloud and value y is generated using value x; a direct causal relationship exists between values x and y. In the example of FIG. 2B, value x is read from the data store and a direct causal relationship exists between values x and y. By way of a non-limiting example, value y may be a value generated at the client computing device 106, which value is based on value x committed to the data store; in such a case, there is a direct causal relationship between value x and value y, value x is the direct causal ancestor of value y, and value x is causally ordered before value y.

Figure 3:
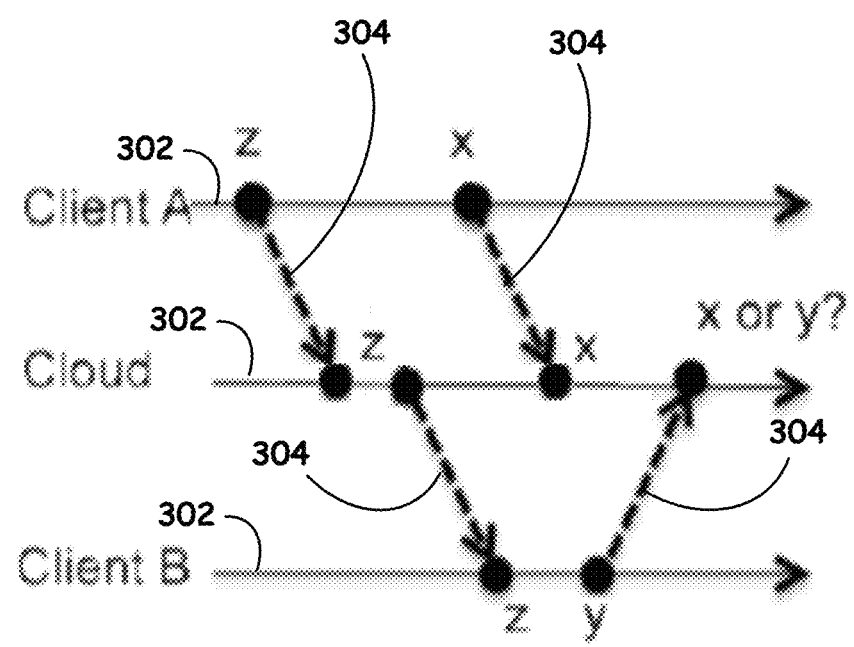

FIG. 3 provides an example of a conflict occurring where a causal relationship is determined to be nonexistent between two values in accordance with one or more embodiments of the present disclosure. In the example shown in FIG. 3, lines 302 represent a timeline representing an elapsed time, and dotted lines 304 represent data transmission between a client computing device 106 and a data store 104. Client A, e.g., which may be one of the client computing device 106, writes value z to data store 306, which may be one of data store(s) 104, and thereafter client B, which may be a different one of the client computing device(s) 106, reads the value z from data store 306. Client A wishes to overwrite the value of z with the value of x and client B wishes to overwrite the value of z with the value of y. In the example, value z is causally ordered before both values x and y; however, there is no causal relationship between the values x and y. As such, values x and y conflict.

Embodiments of the present disclosure determine whether or not a direct causal relationship exists between two versions, or values, of a data item by comparing a tag, e.g., a hash tag, which may be generated using a hash algorithm such as MD5, associated with each data value's version. By way of a non-limiting example, a version of the data item at a data store may have an associated hash value and a data item at the client may have a hash value and a hash_base, or previous commit hash, value. The hash_base value corresponds to the data item's direct causal ancestor's hash value. By way of a non-limiting example and with reference to FIG. 2A, the hash_base value may correspond with value x and the hash value may correspond with value y. By way of a further non-limiting example, a hash_base value received from the client in an update request that includes a new value for a data item may be used to determine whether or not a direct causal relationship exists between value of the data item stored on the server side and the new value of the data item received from the client. A conflict in connection with the data item may be detected by comparing the data store's hash value for the data item and the data item's hash_base value from the client. If the client's hash_base is not the same as, e.g., not equal to, the data store's hash value stored for the data item, a conflict may exist. Where a conflict may exist, further action may be taken to resolve the conflict, including determining that no actual conflict exists. In accordance with one or more embodiments, further action may comprise a conflict resolution, which allows the user(s), client application(s), etc. to determine which value to retain for the data item.

FIG. 4 provides data schema examples for a data store and a client store in accordance with one or more embodiments of the present disclosure. In the example of FIG. 4, schema 402 may be used on the data store, e.g., a data store 104, and schema 404 may be used on the client side, e.g., a data store associated with a client computing device 106. It should be apparent that additional and/or different data fields may be used with one or more embodiments of the present disclosure. In accordance with one or more embodiments, each schema 402 and 404 may be considered to be a record, or data record, associated with a data item.

Schema 402 comprises a number of fields, which may include without limitation one or more of a unique identification, or ID, field 412, a data field 414, which stores content associated with the ID for a data item, a metadata field 416, which stores one or more metadata items such as and without limitation a timestamp, geographic location information and the like, and a hash field 418, which stores the hash corresponding to the value of the data item stored by the data store 104. The hash value stored in hash field 418 may be supplied to a client, e.g., a client computing device 106, along with the value of the data item and the data item's ID in response to a request for the data item from the client. In accordance with one or more embodiments, such information may be supplied to a client computing device 106 by data store 104 via one or more synchronization server(s) 102.

On the client side, schema 404 comprises fields for a data item stored on the client side, which fields may include without limitation one or more of a unique identification, or ID, field 422, a data field 424, metadata field 426, hash field 428 and a hash_base field 430. For a given data item, the ID stored in fields 412 and 422 is the same on the server and client sides. For a given data item identified by its ID, the client's hash_base value stored in field 430 may be compared with the data store's hash value stored in field 418 to determine whether or not a causal relationship exists, which determination may be used to identify whether or not a conflict may exist.

Data field 424 may store data for a given data item, such as and without limitation data generated by an application executing on the client side, e.g., a data value generated by a client application, which may be transmitted to, and received by, one or more of the data store(s) 104. By way of a non-limiting example, a client side application may generate and store a data value in data field 424, and the data value may be sent to the data store(s) 104, which may store the received data value in data field 414. Where a pre-existing value is stored in field 414, in accordance with one or more embodiments of the present disclosure, the synchronization server(s) 102 may be used to determine whether a conflict exists in order to determine whether or not to overwrite the existing value stored in field 414 in response to receipt of a value for the data item from a client.

Field 416 and 426 may store metadata for a data item. By way of a non-limiting example, the metadata field(s) 416 and/or 426 may store metadata, or meta-information, such as might be generated by a client-side application. By way of a non-limiting example, field(s) 418, 428 and 430 may store MD5 hash values generated using a data item's value alone or in combination with the data item's metadata.

In accordance with one or more embodiments, each record schema 402 and 404 may be considered to be key value pairs. By way of a non-limiting example, ID field 412 may correspond to, and store, a key and fields 414, 416 and 418 may be considered to correspond to, and store, value(s) associated with a key. By way of a further non-limiting example, ID field 422 may correspond to, and store, a key and fields 424, 426, 428 and 430 may be considered to correspond to, and store, value(s) associated with a key.

In accordance with one or more embodiments, a request sent by the client, e.g., a client request, and directed to one or more of the data store(s) 104 may be transmitted to the data store(s) 104 via one or more of the synchronization server(s) 102. The client request may include information identifying a type of data operation being requested by the client. FIG. 5 provides examples of fields that may be included in a client request in accordance with one or more embodiments of the present disclosure. In the example shown in FIG. 5, a client request 500 may include an "op" field 502 indicating a data operation associated with the request such as and without limitation a read, write, etc. operation. The client request may further include an ID field 512 containing an identifier uniquely identifying the data item, e.g., the data item that is to be operated on using the operation identified by the "op" field 510. Fields 514, 516, 518 and 530 may, or may not, be included in the request depending on the requested operation. By way of a non-limiting example, fields 514, 516, 518 and/or 530 may be included in a write, or update, request, and may not necessarily be included in a read request.

In accordance with one or more embodiments, in response, the client may receive information in response to the client's request. FIG. 6 provides examples of fields that may be included in a response to a client request in accordance with one or more embodiments of the present disclosure. Such a response may be provided by a data store 104. In the example shown in FIG. 6, a response 600 may include one or more fields such as and without limitation status field 610, ID field 612, data field 614, metadata, or meta_data, field 616 and hash field 618. By way of a non-limiting example, status field 610 may comprise information indicating a processing status, or outcome, of the client's request, which may include without limitation such status as fail, write, conflict, read, etc. A fail status may be used to indicate that an error occurred during processing of the request, the write status may be used to indicate that the data has successfully been written to the server's data store in response to an update request, the read status may be used to indicate that the data has been successfully read from the server's data store in response to a read request, the conflict status may be used to indicate that a conflict was detected between the data supplied by the client and the data stored by the data store.

In accordance with one or more embodiments, synchronization server 102 implements an update process that uses causal relationship information to ensure that data item(s) is/are updated sequentially. In accordance with one or more such embodiments, the update process may use a read-compare-write operation comprising reading the data item's hash_base value, e.g., the hash_base value received from a client in an update request, comparing the data item's hash_base value with the data item's hash value from the data store, and writing, or updating, the data item's value where the comparison of the data item's hash_base value and hash value indicates that the stored value of the data item has a direct causal relationship with the new value of the data item. In accordance with one or more embodiments, a direct causal relationship exists where the data item's hash_base and hash values correspond, e.g., have the same value.

In accordance with one or more embodiments, the read-compare-write operation may be a transactional operation, such that, for example and without limitation, an update to the data may be reversed prior to completion of an update operation, which completion may comprise a commit of the data. In a case that a read-compare-write operation being performed for a first client is not transactional, there is a chance that a second client may be allowed to update the same data item, the first client's update may overwrite the second client's update. In any case, embodiments of the present disclosure ensure that the last written value will be synchronized with respect to any future access to the data item.

Figure 7A:
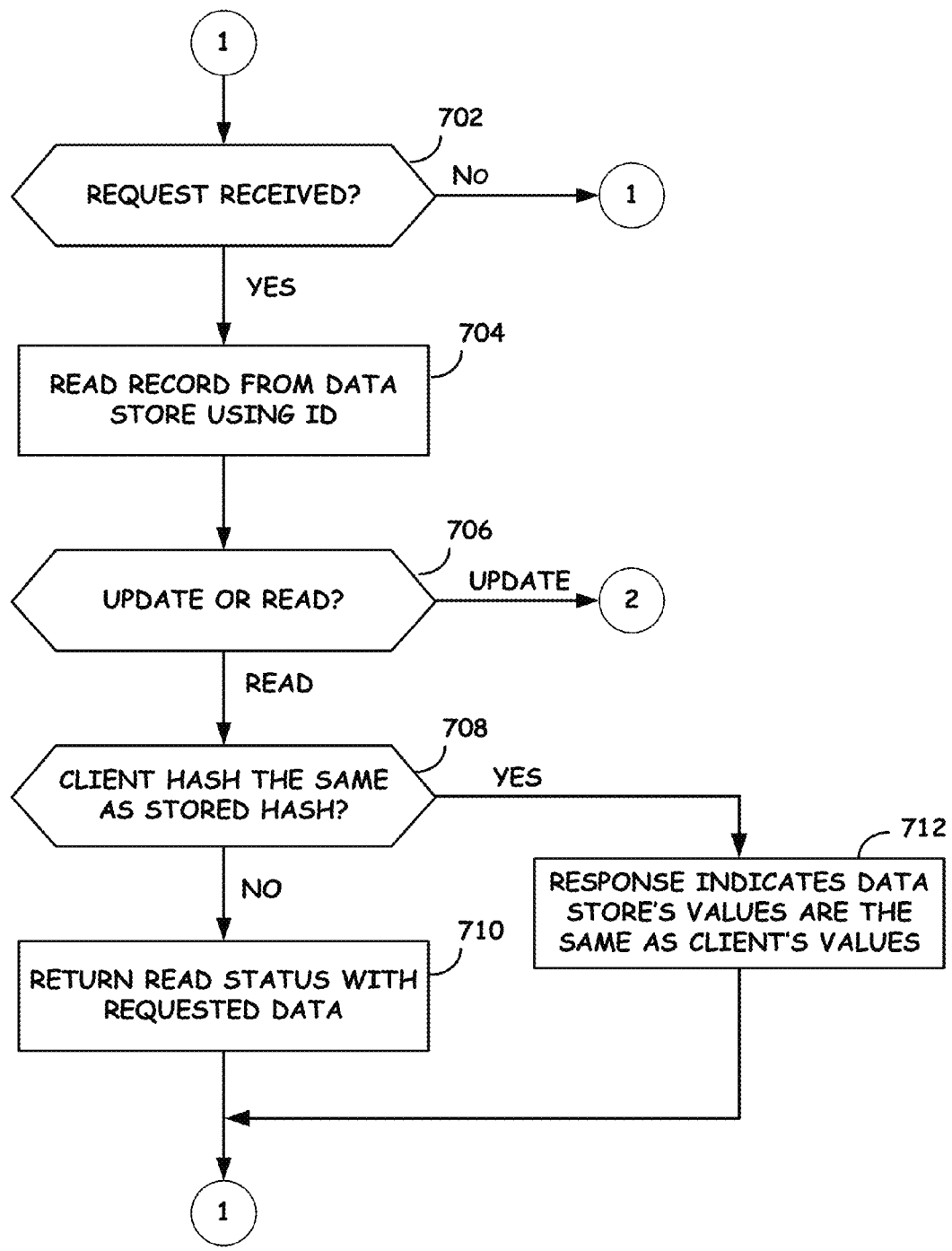
Figure 7B:
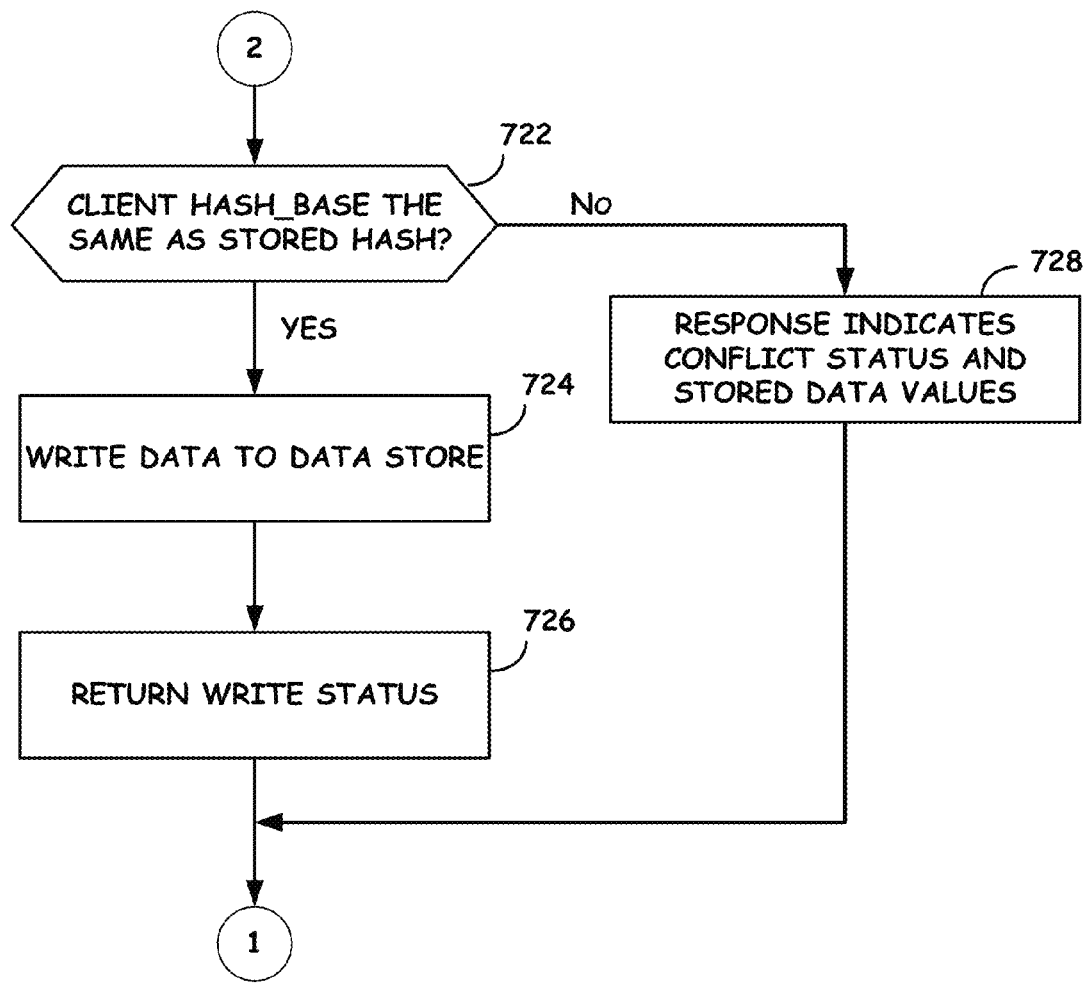

FIG. 7, which comprises FIGS. 7A and 7B, provides an example of a synchronization process flow in accordance with one or more embodiments of the present disclosure. The synchronization process flow may be performed by one or more synchronization server(s) 102. The synchronization process may be performed for each request received by the synchronization server(s) 102. At step 702, a determination is made whether a request has been received, e.g. from a client computing device 106. If not, processing may continue and await receipt of a request. If the determination at step 702 indicates that a request has been received by the synchronization server 102, processing continues at step 704 to retrieve a record, e.g., record 402, from the data store 104. By way of a non-limiting example, the client request may take a form such as that shown in FIG. 5, e.g., request 500, which includes an identifier, or ID, of the data item, and the received ID may be used to retrieve record 402 from the data store 104.

At step 706, the requested operation is determined. By way of a non-limiting example, the client request, e.g., request 500, may include information identifying the requested operation, e.g., op field 510 of request 500. If it is determined, at step 706, that the requested operation is a read operation, processing continues at step 708 to make a determination whether the client's hash value corresponds to the data store's hash value for the data item. By way of a non-limiting example, the value from field 518 of request 500 may be compared with the value stored in field 418 of record 402 to determine whether the values are the same, e.g. are equal. Such a determination may be used to identify whether to send the requested data item's record to the requester in response to the request; where the hash values are the same, the data item's value(s), e.g., data and metadata, stored at the data store(s) 104 is/are considered to be the same as the values already available at the client computing device 106, and there is no need to send the values in response to the request. If it is determined, at step 708, that the hash values do not correspond, processing continues at step 710 to provide a response, e.g., response 600, indicating a successful read, e.g., in status field 610 of response 600, together with the data for the requested data item, in field 614 of response 600. In accordance with one or more embodiments, as shown in connection with response 600, the response may further include metadata 616 as well as the hash value 618 associated with the data value returned in field 614. In accordance with one or more such embodiments, the hash value returned in field 618 may be used in a direct causal ancestor determination performed in connection with an update request in connection with the data item. Processing may continue at step 702 to process another request received by the synchronization server 102, if any.

If it is determined that step 708 that the client's hash and the data store's hash are the same, processing continues at step 712 to provide a response with a status indicating that the value(s) stored at the data store is/are the same as those stored for the client. In such a case, there may be no need to forward values for the data, metadata and hash; however, the response may include these values.

If it is determined at step 706 that the requested operation is an update, or write, operation, processing continues at step 722 of FIG. 7B. At step 722, a determination is made whether the client's hash_base value corresponds to the data store's stored hash value for the data item identified by its ID value, e.g., the value received in field 512 of request 500. By way of a non-limiting example, the determination may be made by comparing the hash_base value in field 530 of request 500 with the data item's hash value stored in the hash field 418 of record 402 stored by data store 104. If so, processing continues at step 724 to write the data to the data item's data record 402 at the data store 104. By way of a non-limiting example, synchronization server 102 may forward some or all of fields 510, 512, 514, 516 and 518 of the request 500 to the data store 104 for storing in the data item's record 402. Processing continues at step 726 to return a response, e.g., response 600, which indicates a successful write operation. The response may include some or all of fields 610, 612, 614, 616 and 618 of response 600, for example. Processing continues at step 702 to process any further request received by the synchronization server 102.

If it is determined at step 722 that the client's hash_base value and the data store's hash value are not the same, e.g., the value provided in field 530 of the client's request 500 is not the same as the value stored in field 418 of the data item's record 402, the data item value(s) stored in the data store 104 is/are not the direct causal ancestor of the data item value received on the client's request, and processing continues at step 728 to provide a response indicating that a conflict exists between the client's version of the data item and the data store's version of the data item. By way of a non-limiting example, synchronization server 102 may provide a response 600, in which the status 610 indicates that the write operation did not successfully complete, or was unsuccessful, due to an existing conflict between the versions of the data item, e.g., the client's version and the data store's version of the data item. By way of a non-limiting example, response 600 may be provided by synchronization server 102 with a failed status identified in status field 610. By way of a further non-limiting example, the status field 610 may provide a reason for the inability to successfully complete the requested operation, such as and without limitation an indication that a conflict exists, etc. The response provided at step 728 may be used at the client computing device 106 to resolve the conflict detected by the synchronization server 102. By way of some non-limiting examples, the conflict may be presented to the user with options for selection by the user, such as and without limitation an option to select the version of the data stored by the data store 104 or to select the local version. By way of a further non-limiting example, the conflict might be resolved at the client computing device 106 by a client application. Processing continues at step 702 to process any further request received by the synchronization server 102.

In the example shown in FIG. 7, a single data item is processed in connection with a request. It should be apparent that more than one data item may be process for a given request. By way of a non-limiting example, a request may comprise one or more operations, and each operation may be performed for one or more data items.

FIG. 8 provides an example of pseudocode corresponding to the process flow of FIG. 7, which further illustrates a synchronization process in accordance with one or more embodiments of the present disclosure. In the example shown in FIG. 8, request i may correspond to request 500 received from a client computing device 106, which device is referred to as the client in the pseudocode, and record j may correspond to record 402, which may be retrieved, or read from, a data store 104, which data store is referred to in the pseudocode as cloud storage.

As shown in the example of FIG. 8, a response returned at step 710 of FIG. 7A may include, in addition to a status in field 610, values for fields 412, 414, 416 and 418 of record 402 in fields 612, 614, 616 and 618 (respectively) of response 600, a response returned at step 726 may include fields 610 and 612 of response 600, and a response returned at step 728 may include, in addition to a status in field 610, values of fields 412, 414, 416 and 418 of record 402 in fields 612, 614, 616 and 618 (respectively) of response 600. The hash value from field 418, which may be returned in field 618 of response 600 may be stored as the data item's hash and hash_base values stored in fields 518 and 530 (respectively) of record 500 in the local storage of a client computing device 106. Matching values in the hash and hash_base fields of record 404 may indicate that the data item field(s) used to generate the hash is/are unchanged from the data item's direct causal ancestor.

As shown in the examples of FIGS. 7 and 8, the synchronization server(s) 102 ensures that a data item in the data store(s) 104 is updated in a sequential manner based on causal relationship(s) associated with the data item. In other words, one or more values stored in a data item's record by a data store 104 may be updated, or overwritten, using value(s) determined to have a direct causal relationship with the data store's stored value(s) for the data item. By way of a non-limiting example, before a data item's record 402 is updated at the data store 104, synchronization server 102 retrieves the hash value associated with the data item's record 402 stored at the data store 104 and compares the retrieved hash value with the hash_base value provided by a client computing device 106 making a request to update the data item's value(s) in order to determine whether the data value(s) provided by the client computing device 106 has/have a direct causal relationship with the value(s) stored at the data store 104. Synchronization server 102 may detect a conflict between the version of the data received from the client computing device 106 and the version of the data received from the data store 104 where the hash_base and hash values do not match; alternatively, synchronization server 102 may identify that the version of the data stored at the data store 104 is a direct causal ancestor to the version of the data received from the client computing device 106 where the hash_base and hash values match.

Figure 9:
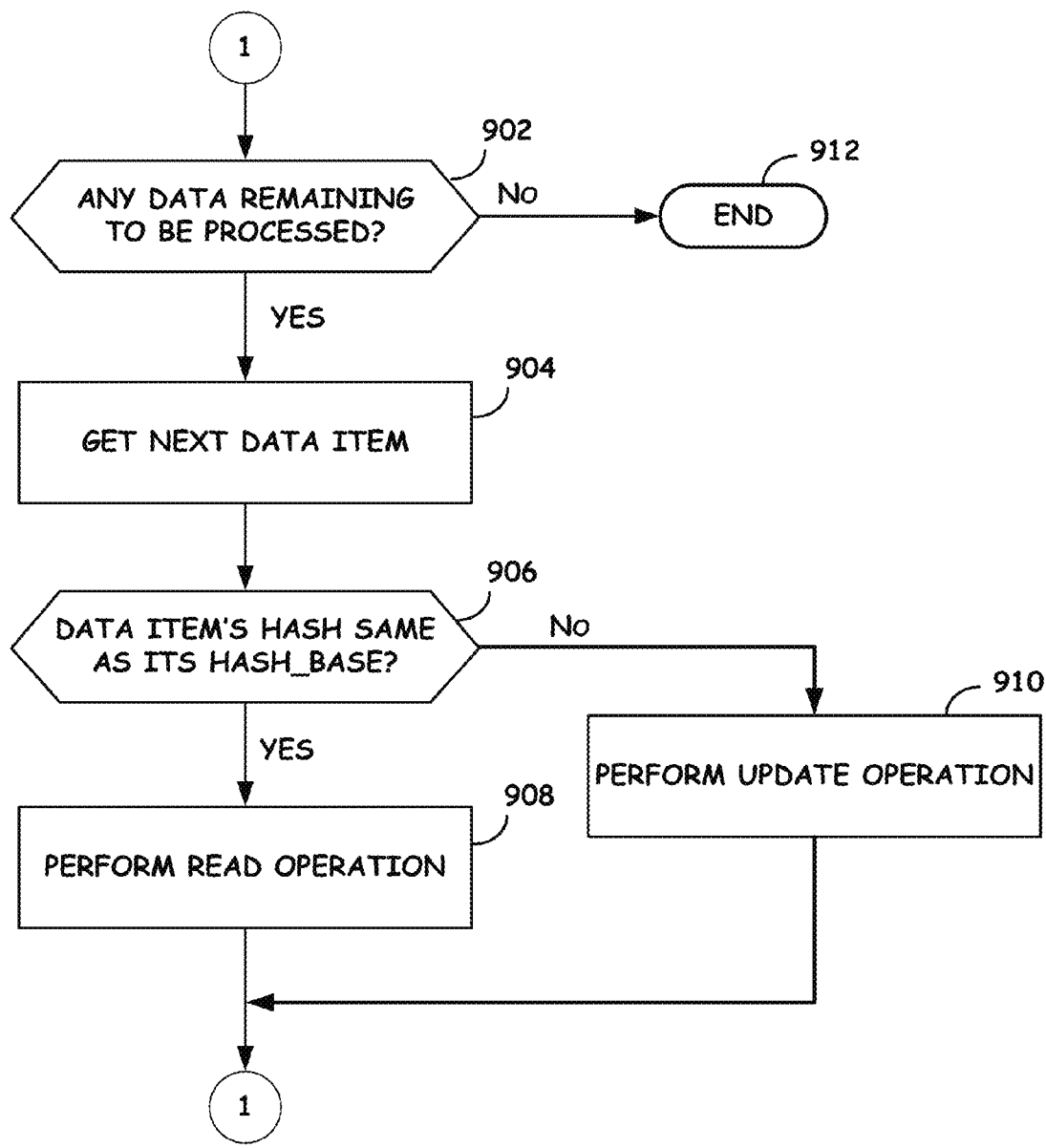

FIG. 9 provides an example of request generation process flow in accordance with one or more embodiments of the present disclosure. By way of a non-limiting example, the process flow shown in FIG. 9 may be performed by a client computing device 106. In accordance with one or more embodiments, the process may be executed in a background thread without user awareness. The background thread may notify a client application's thread in a case that some data is updated or read by the background thread. A response received in connection with a request may be used to update local storage of a client computing device 106

At step 902, a determination is made whether any data items remain to be processed. If not processing ends at step 912. If a determination is made, at step 902, that data items remain to be processed, processing continues at step 904 to get the next data item to be processed. A determination is made, at step 906, whether the data item's hash value, which may be determined using the data item's value stored in field 424 alone or in combination with some or all of the data item's metadata stored in field 426 of local store record 404, is the same as the data item's hash_base value, which may be stored in field 430 of record 404. The comparison performed at step 906 may be used to determine whether the data item's data value has been updated at the client computing device 106, e.g., by a client application, since the data item's record was read from the data store 104.

If the outcome of the determination made at step 906 is that the hash and hash_base values are the same, a request may be considered to be a read request, and the read operation is performed at step 908. By way of a non-limiting example, a read request may be initiated at step 908, which may include transmitting some or all of the fields of request 500 to the data store(s) 104 via the synchronization server(s) 102. By way of a non-limiting example, a read request may comprise an read operation indicator in field 510 of request 500, the data item's ID in field 512, and the data item's hash 518.

By way of a non-limiting example, a read request may be used to determine whether a data item's values held in local storage of the client computing device 106 are synchronized with the data item's values held by the data store(s) 104. The synchronization server 102 may compare the data item's hash value from field 518 of request 500 with the data item's hash value retrieved from field 418 of record 402 stored by data store 104 to make a determination whether the data value(s) stored in the data item's record 402 at the data store 104 correspond to the data value(s) stored in the data item's record 404 in local storage of the client computing device 106. Where the hash values match, synchronization server 102 may indicate that the data store and client store value(s) are synchronized in its response to the read request made by the client computing device 106.

By way of a further non-limiting example, a read request may be used to retrieve a data item, for which no data values are stored in a local store of the client computing device 106. In such a case, the value of hash field 518 of request 500 may be null, resulting in a determination by the synchronization server 102 to return the data item value(s) for the data item identified in the request 500 to the client computing device 106 in response to the request.

If the outcome of the determination made at step 906 is that the local hash and hash_base values are not the same, e.g. do not match or are different, a request to be considered to be a write, or update, operation, which operation may be performed at step 910. By way of a non-limiting example, a write request may be initiated at step 910, which may include transmitting some or all of the fields of request 500 to the data store(s) 104 via the synchronization server(s) 102. For either a read or a write operation, processing continues at step 902 to process any remaining data.

Figure 10A:
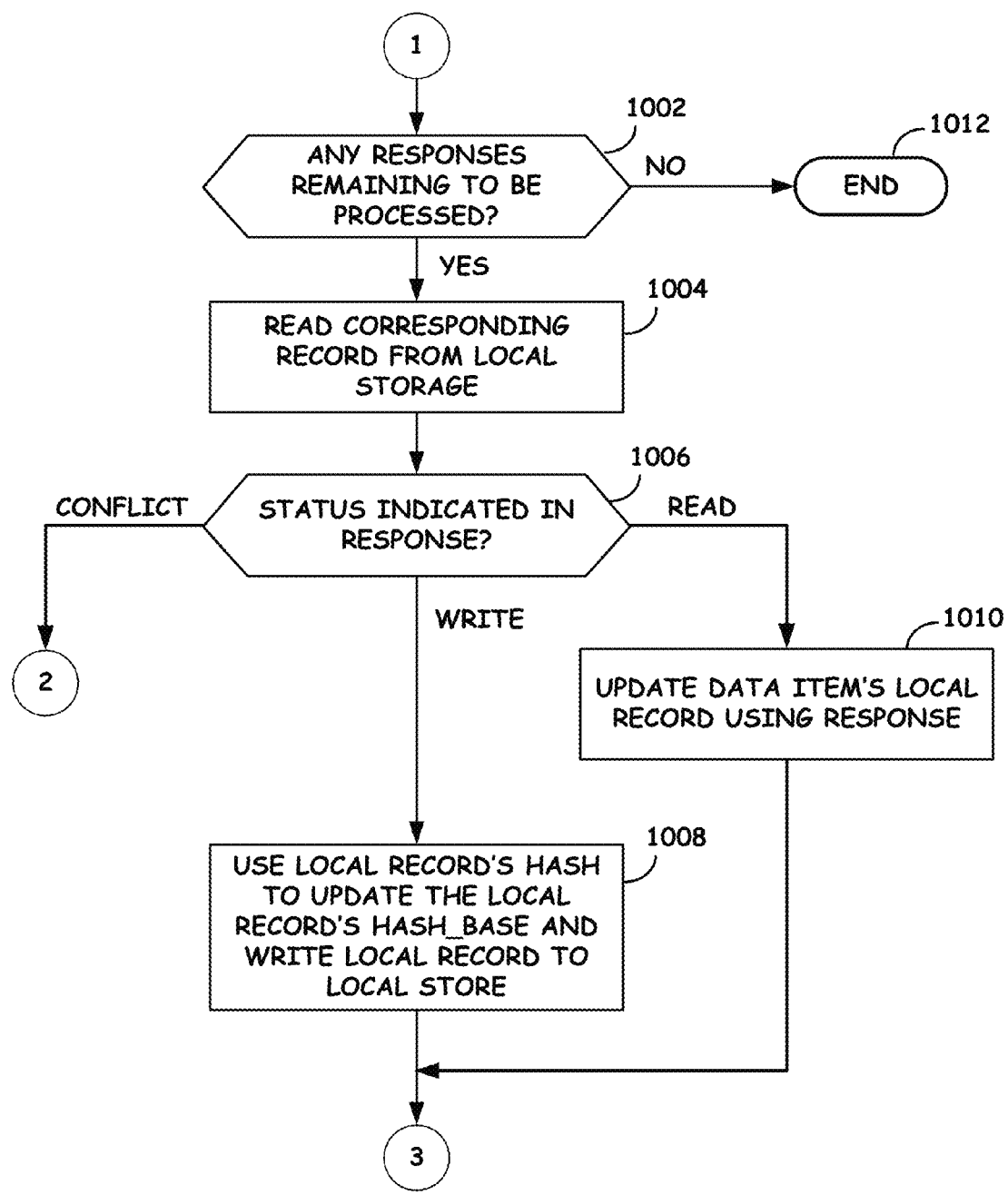
Figure 10B:
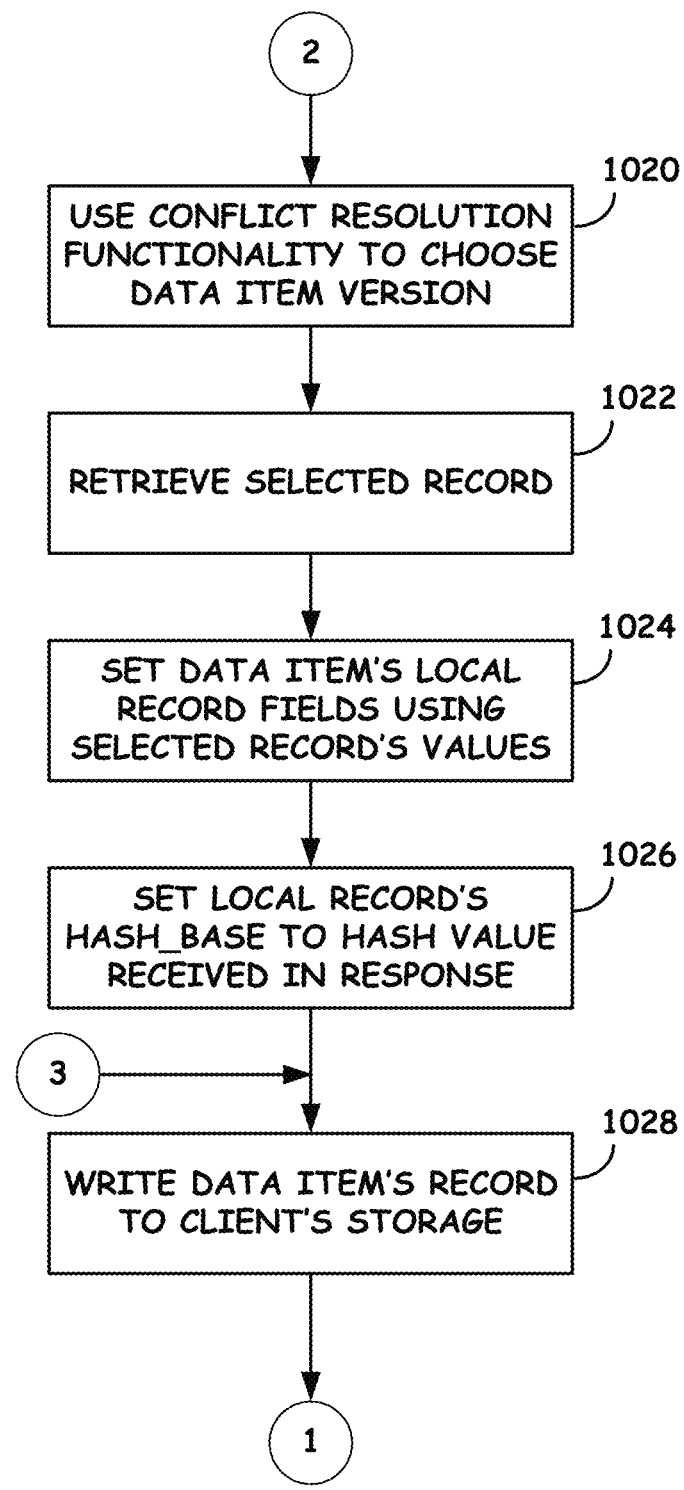

FIG. 10, which comprises FIGS. 10A and 10B, provides an example of a request response handling process flow in accordance with one or more embodiments of the present disclosure. The process flow of FIG. 10 may be performed by the client computing device 106 when a response to the client's request is received, e.g., a response received from synchronization server 102. The process may update a local store of the client computing device 106. Such an update may use data received with the response and the data stored by the local store.

At step 1002, a determination is made whether any responses remain to be processed. If not processing may end at step 1012. Alternatively and where a determination is made that no responses remain to be processed, processing may continue and await receipt of a response, e.g. a response received from a request transmitted by the client computing device 106 to the data store(s) 104 via the synchronization server(s) 102.

If it is determined, at step 1002, that at least one response remains to be processed, processing continues at step 1004 to read a corresponding record from local storage of the client computing device 106. By way of a non-limiting example, the ID value received in field 612 of response 600 may be used to retrieve a corresponding record 404 having the same ID value. At step 1006, a determination is made whether the status information provided in the response, e.g., status provided in status field 610 of response 600, indicates a conflict, write, or read status. If the status field 610 of response 600 indicates a write status, e.g., a status indicating successful completion of the data item's update at the data store(s) 104 in connection with a corresponding write request by the client computing device 106, processing continues at step 1008 to update the hash_base field 430 of record 404 with the data item's hash value contained in the hash field 428 of record 404, and processing continues at step 1028 to write the local record to the data store local to the client computing device 106. By way of a non-limiting example, step 1008 updates the hash_base field 430 to correspond with the value of the hash contained in field 430 of the data item's record 402 at the data store(s) 104. Processing continues at step 1002 to process any remaining responses.

Is it is determined, at step 1006, that the status field 610 of response 600 indicates a read status, e.g., a status indicating successful completion of the data item's retrieval from the data store(s) 104 in connection with a corresponding read request by the client computing device 106, processing continues at step 1010 to update the data item's local record 404 using the information contained in the response. By way of a non-limiting example, fields 424, 426, 428 and 430 of local record 404 are updated using values contained in the fields provided in the response 600 received by the client computing device 106, e.g., from the synchronization server 102. By way of a further non-limiting example, fields 424 and 426 are updated using the values contained in fields 614 and 616 of response 600 and fields 428 and 430 are updated using the value contained in field 618 of response 600. At step 1028, the local record 404 is written to the data store local to the client computing device 106, and processing continues at step 1002 to process any remaining responses.

If it is determined, at step 1006, that the status field 610 of response 600 indicates a conflict status, e.g., a status indicating an unsuccessful completion of a request made by the client computing device 106, processing continues at step 1020 to use a conflict resolution to choose a version of the data item. By way of a non-limiting example, the conflict resolution may be used to choose between the version of the data item stored at the data store(s) 104 and the version of the data item stored local to the client computing device 106. In accordance with one or more embodiments, the user may be given an opportunity to make the selection. Alternatively, the client application may make the selection, which selection may be based on user preferences, which may be explicitly or impliedly specified by the user, based on application default(s), based on some combination of user preferences and application defaults, etc. At step 1022, the record selected based on the conflict resolution performed at step 1020 is retrieved. At step 1024, the local record 404 of the data item is updated using the selected record's value(s). By way of a non-limiting example, fields 424, 426, 428 are updated using the corresponding fields from the selected record, and the hash_base field 430 of the data item's local record 404 is updated using the hash value from hash field 618 of response 600 at step 1026. By setting the local record's hash_base value to the hash value from field 618 of response 600, the data value(s) at the data store(s) 104 will be considered to be the direct causal ancestor of the resolved value(s) selected at step 1020, thereby allowing the resolved value(s) selected at step 1020 to overwrite the data values at the data store(s) 104 in an update operation, assuming that another update operation does not intervene, i.e., is not performed, before such an update operation is attempted using the resolved value(s) selected at step 1020. Processing continues at step 1028 to write the data item's local record 404 to the data store local to the client computing device 106. Processing continues at step 1002 to process any remaining requests.

FIGS. 11 and 12 provide examples of pseudocode corresponding to the process flows of FIGS. 9 and 10. The example pseudocode shown in FIG. 11 corresponds with FIG. 9's process flow and the pseudocode shown in FIG. 12 corresponds with FIG. 10's process flow. In the example shown in FIG. 11, i represents a local record, such as record 404 of the local store for the client computing device 106. In the example shown in FIG. 12, i represents a response, such as response 600, j represents a local record, such as record 404 of the local store for the client computing device 106, and r represents a record selected from a conflict resolution process performed in response to a conflict status.

In accordance with at least one embodiment, eventual consistency is guaranteed. Embodiments of the present disclosure may accomplish such consistency without requiring a lock and/or without maintaining state, which facilitates easy horizontal scaling. In accordance with one or more embodiments, a batch approach may be used to process multiple records and save network costs. In accordance with one or more embodiments, the synchronization capability provided need not rely on versioning, which allows such synchronization to integrate easily with different local stores on the client-side in remote data stores.

In accordance with one or more embodiments, the client computing device(s) 106 may receive notification(s) about changes(s) at the data store(s) 104, which notification may include an ID of the data created, updated or deleted at the data store(s) 104. A client computing device 106 may register an interest in such changes. In response to receiving a notification, the client computing device 106 may read an updated or created data item from the data store(s) 104 or delete a data item from local store at the client computing device 106, for example.

Figure 13:
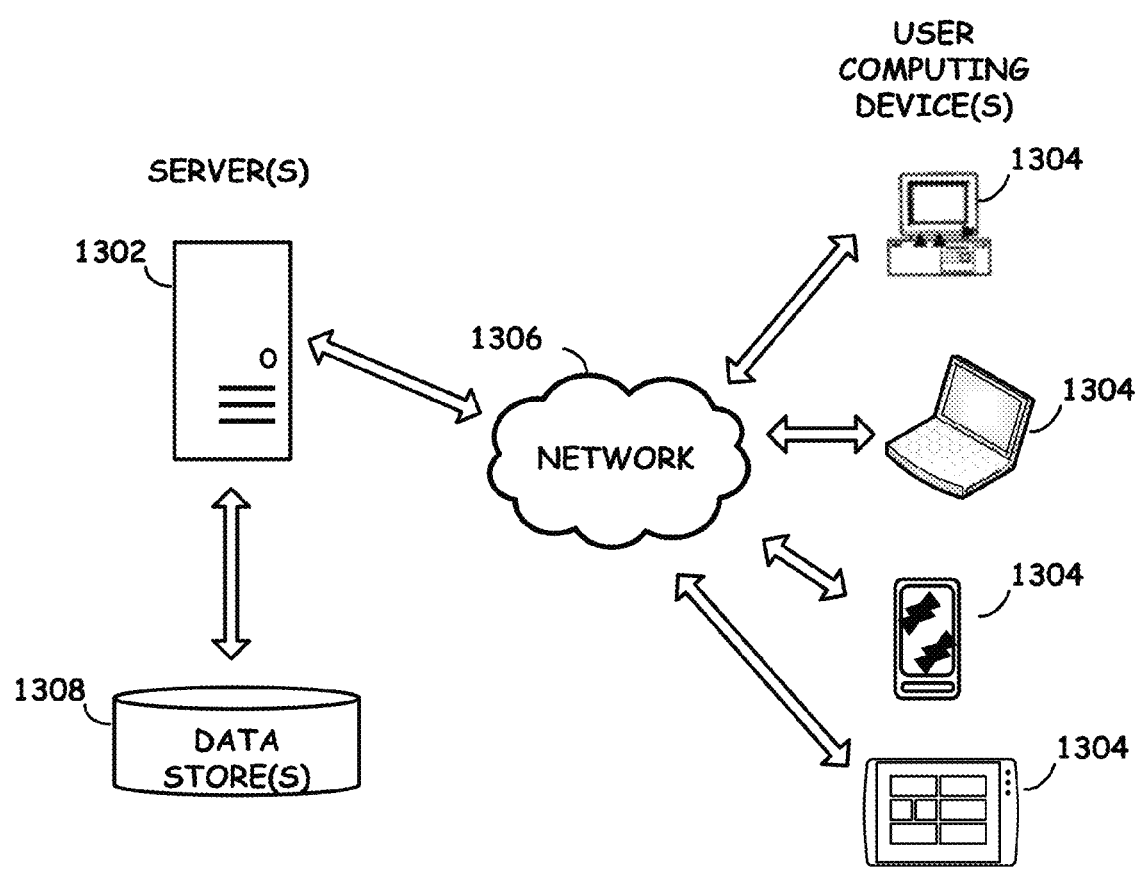
FIG. 13 illustrates some components that can be used in connection with one or more embodiments of the present disclosure.

FIG. 13 illustrates some components that can be used in connection with one or more embodiments of the present disclosure. In accordance with one or more embodiments of the present disclosure, one or more computing devices, e.g., one or more server computing devices, user/client computing devices or other computing device, are configured to comprise functionality described herein. For example, a computing device 1302 can be configured to execute program code, instructions, etc. to provide functionality, such as that illustrated in FIGS. 7 and 9, in accordance with one or more embodiments of the present disclosure. The same or another computing device 1302 may be configured to execute program code to implement functionality, such as that illustrated in FIGS. 9, 10, 11 and 12, in accordance with one or more embodiments of the present disclosure.

Computing device 1302 may serve content to user computing devices 1304 using a browser application via a network 1306. Data store(s) 1308, which may include data store(s) 104, may be used to store program code to configure a server 1302 to perform functionality in accordance with one or more embodiments of the present disclosure.

The computing device 1304 may be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1302 and the user computing device 1304 can include one or more processors, memory, a removable media reader, network interface, display and interface, and one or more input devices, e.g., keyboard, keypad, mouse, etc. and input device interface, for example. One skilled in the art will recognize that server 1302 and user computing device 1304 may be configured in many different ways and implemented using many different combinations of hardware, software, or firmware.

In accordance with one or more embodiments, a computing device 1302 can make a user interface available to a user computing device 1304 via the network 1306. The user interface made available to the user computing device 1304 can include content items, or identifiers (e.g., URLs) selected for the user interface in accordance with one or more embodiments of the present invention. In accordance with one or more embodiments, computing device 1302 makes a user interface available to a user computing device 1304 by communicating a definition of the user interface to the user computing device 1304 via the network 1306. The user interface definition can be specified using any of a number of languages, including without limitation a markup language such as Hypertext Markup Language, scripts, applets and the like. The user interface definition can be processed by an application executing on the user computing device 1304, such as a browser application, to output the user interface on a display coupled, e.g., a display directly or indirectly connected, to the user computing device 1304.

In an embodiment the network 1306 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 13. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 14:
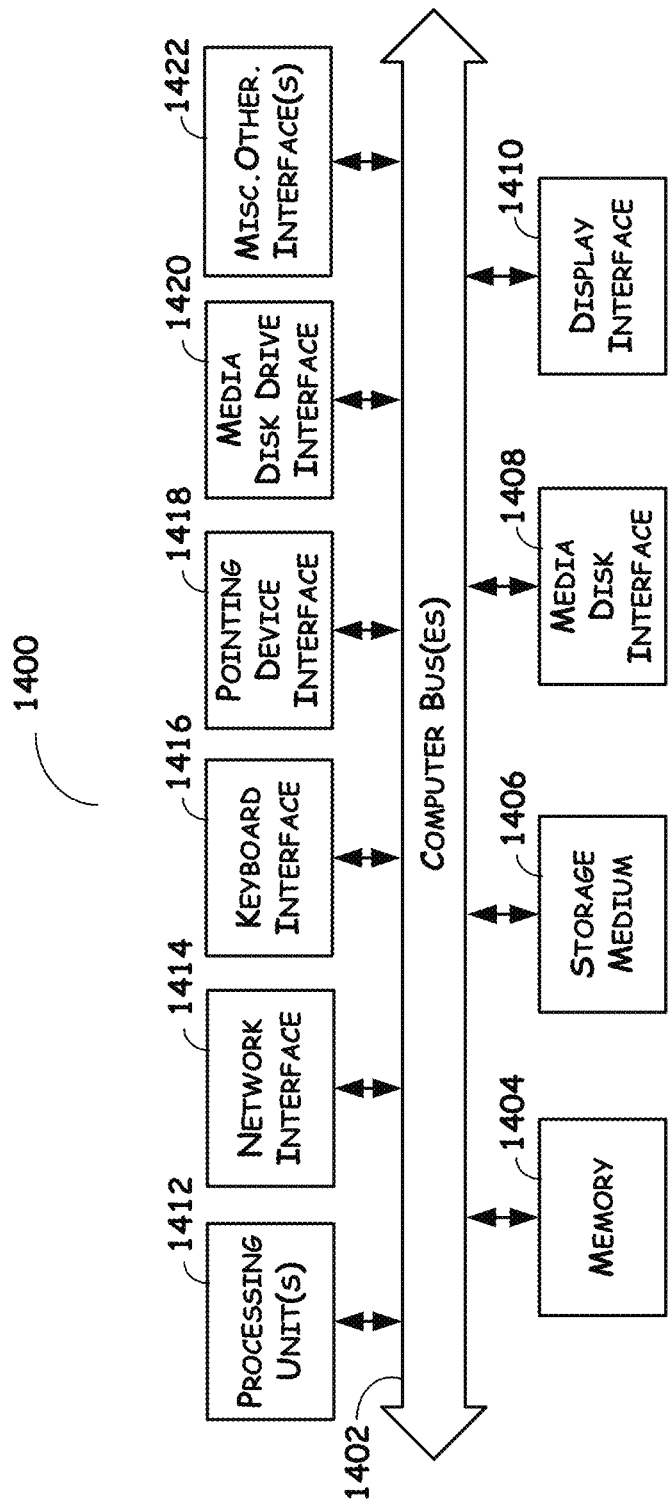
FIG. 14 is a detailed block diagram illustrating an internal architecture of a computing device in accordance with one or more embodiments of the present disclosure.

FIG. 14 is a detailed block diagram illustrating an internal architecture of a computing device, e.g., a computing device such as server 1302 or user computing device 1304, in accordance with one or more embodiments of the present disclosure. As shown in FIG. 14, internal architecture 1400 includes one or more processing units, processors, or processing cores, (also referred to herein as CPUs) 1412, which interface with at least one computer bus 1402. Also interfacing with computer bus 1402 are computer-readable medium, or media, 1406, network interface 1414, memory 1404, e.g., random access memory (RAM), run-time transient memory, read only memory (ROM), etc., media disk drive interface 1420 as an interface for a drive that can read and/or write to media including removable media such as floppy, CD-ROM, DVD, etc. media, display interface 1410 as interface for a monitor or other display device, keyboard interface 1416 as interface for a keyboard, pointing device interface 1418 as an interface for a mouse or other pointing device, and miscellaneous other interfaces not shown individually, such as parallel and serial port interfaces, a universal serial bus (USB) interface, and the like.

Memory 1404 interfaces with computer bus 1402 so as to provide information stored in memory 1404 to CPU 1412 during execution of software programs such as an operating system, application programs, device drivers, and software modules that comprise program code, and/or computer-executable process steps, incorporating functionality described herein, e.g., one or more of process flows described herein. CPU 1412 first loads computer-executable process steps from storage, e.g., memory 1404, computer-readable storage medium/media 1406, removable media drive, and/or other storage device. CPU 1412 can then execute the stored process steps in order to execute the loaded computer-executable process steps. Stored data, e.g., data stored by a storage device, can be accessed by CPU 1412 during the execution of computer-executable process steps.

Persistent storage, e.g., medium/media 1406, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
    receiving, by a synchronization server computer providing data synchronization without versioning for at least one data storage system, a request, of a client computing device, to perform a data storage operation in connection with the at least one data storage system, the request having associated information comprising a data identifier and a synchronization value;
    retrieving, by the synchronization server computer from a data store of the at least one data storage system, the data store's synchronization value using the request's data identifier;
    making a determination, by the synchronization server computer, whether the data store's data identified by the request's data identifier is a direct causal ancestor of data associated with the request, the direct causal ancestor determination being made by comparing the request's synchronization value and data store's synchronization value;
    determining, by the synchronization server computer, whether to permit the data storage system to make the requested data storage operation based on the direct causal ancestor determination and without using versioning information; and
    making a determination whether to update the data store's synchronization value in response to the request, and updating the data store's synchronization value in accordance with the update determination.

2. The method of claim 1, further comprising:
    the request's data storage operation comprising an update operation to overwrite at least one data value of the data store's data with at least one updated data value of the request, the request's synchronization value comprising a synchronization value for the request's at least one updated data value and a synchronization base value for the direct causal ancestor of the request's at least one updated data value, the direct causal ancestor determination further comprising:

comparing the request's synchronization base value with the data store's synchronization value to make a determination whether or not the at least one data value of the data store's data identified by the request's data identifier is the direct causal ancestor of the request's at least one updated data value; and if the at least one data value of the data store's data identified by the request's data identifier is determined to be the direct causal ancestor of the request's at least one updated data value, the determining whether to permit the requested data storage operation further comprising:

permitting the at least one data storage system to use the request's at least one updated data value to overwrite the data store's at least one data value; and causing the request's synchronization value to overwrite the data store's synchronization value.

3. The method of claim 2, further comprising:

if the at least one data value of the data store's data identified by the request's data identifier is determined not to be the direct causal ancestor of the request's at least one updated data value, the determining whether to permit the requested data storage operation further comprising:

providing a response to the request indicating that a conflict exists, the response comprising the data store's at least one data value identified by the request's data identifier for resolution by the requester.

4. The method of claim 2, the request's synchronization value comprising a hash generated using the request's at least one updated data value, the request's synchronization base value comprising a hash generated using at least one data value of the direct causal ancestor of the request's at least one updated data value, and the data store's synchronization value comprising a hash generated using the data store's at least one data value.

5. The method of claim 2, the data store's at least one data value and the request's at least one updated data value each comprising a data value and metadata associated with the data value.

6. The method of claim 1, further comprising:

the request's data storage operation comprising a read operation to read at least one data value of the data store's data requested by the request, the request's synchronization value comprising a synchronization value for the request, the direct causal ancestor determination further comprising:

comparing the request's synchronization value with the data store's synchronization value to make a determination whether or not the requested at least one data value is different from the at least one data value of the data store's data; and if the requested at least one data value is determined to be different from the at least one data value of the data store's data, the determining whether to permit the requested data storage operation further comprising:

permitting the at least one data storage system to read the at least one data value of the data store's data; and providing a response comprising the at least one data value of the data store's data and the data store's synchronization value associated with the at least one data value of the data store's data.

7. The method of claim 6, the request's synchronization value comprising a hash generated using at least one data value associated with the request and the data store's synchronization value comprising a hash generated using the data store's at least one data value.

8. The method of claim 6, the requested at least one data value comprising a data value and metadata associated with the data value.

9. A system comprising:

a processor of a synchronization server computer providing data synchronization without versioning for at least one data storage system;

a storage medium for tangibly storing thereon program logic for execution by the processor, the stored program logic comprising:

receiving logic executed by the processor for receiving a request, of a client computing device, to perform a data storage operation in connection with the at least one data storage system, the request having associated information comprising a data identifier and a synchronization value;

retrieving logic executed by the processor for retrieving from a data store of the at least one data storage system, the data store's synchronization value using the request's data identifier;

determining logic executed by the processor for making a determination whether the data store's data identified by the request's data identifier is a direct causal ancestor of data associated with the request, the direct causal ancestor determination being made by comparing the request's synchronization value and the data store's synchronization value;

determining logic executed by the processor for determining whether to permit the at least one data storage system to make the requested data storage operation based on the direct causal ancestor determination and without versioning information; and determining logic executed by the processor for making a determination whether to update the data store's synchronization value in response to the request, and updating the data store's synchronization value in accordance with the update determination.

10. The system of claim 9, further comprising:

the request's data storage operation comprising an update operation to overwrite at least one data value of the data store's data with at least one updated data value of the request, the request's synchronization value comprising a synchronization value for the request's at least one updated data value and a synchronization base value for the direct causal ancestor of the request's at least one updated data value, the direct causal ancestor determination further comprising:

comparing logic executed by the processor for comparing the request's synchronization base value with the data store's synchronization value to make a determination whether or not the at least one data value of the data store's data identified by the request's data identifier is the direct causal ancestor of the request's at least one updated data value; and if the at least one data value of the data store's data identified by the request's data identifier is determined to be the direct causal ancestor of the request's at least one updated data value, the determining logic executed by the processor for determining whether to permit the requested data storage operation further comprising:

permitting logic executed by the processor for permitting the at least one data storage system to use the request's at least one updated data value to overwrite the data store's at least one data value; and causing logic executed by the processor for causing the request's synchronization value to overwrite the data store's synchronization value.

11. The system of claim 10, further comprising:
if the at least one data value of the data store's data identified by the request's data identifier is determined not to be the direct causal ancestor of the request's at least one updated data value, the determining logic executed by the processor for determining whether to permit the requested data storage operation further comprising:
providing logic executed by the processor for providing a response to the request indicating that a conflict exists, the response comprising the data store's at least one data value identified by the request's data identifier for resolution by the requester.

12. The system of claim 10, the request's synchronization value comprising a hash generated using the request's at least one updated data value, the request's synchronization base value comprising a hash generated using at least one data value of the direct causal ancestor of the request's at least one updated data value, and the data store's synchronization value comprising a hash generated using the data store's at least one data value.

13. The system of claim 10, the data store's at least one data value and the request's at least one updated data value each comprising a data value and metadata associated with the data value.

14. The system of claim 9, further comprising:
the request's data storage operation comprising a read operation to read at least one data value of the data store's data requested by the request, the request's synchronization value comprising a synchronization value for the request, the direct causal ancestor determination further comprising:
comparing logic executed by the processor for comparing the request's synchronization value with the data store's synchronization value to make a determination whether or not the requested at least one data value is different from the at least one data value of the data store's data; and
if the requested at least one data value is determined to be different from the at least one data value of the data store's data, the determining logic executed by the processor for determining whether to permit the requested data storage operation further comprising:
permitting logic executed by the processor for permitting the at least one data storage system to read the at least one data value of the data store's data; and
providing logic executed by the processor for providing a response comprising the at least one data value of the data store's data and the data store's synchronization value associated with the at least one data value of the data store's data.

15. The system of claim 14, the request's synchronization value comprising a hash generated using at least one data value associated with the request and the data store's synchronization value comprising a hash generated using the data store's at least one data value.

16. The system of claim 14, the requested at least one data value comprising a data value and metadata associated with the data value.

17. A computer readable non-transitory storage medium for tangibly storing thereon computer readable instructions that when executed cause at least one processor to:

provide a synchronization service without versioning to at least one data storage system, the computer readable instructions comprising instructions to:
receive a request, of a client computing device, to perform a data storage operation in connection with the at least one data storage system, the request having associated information comprising a data identifier and a synchronization value;
retrieve, from a data store of the at least one data storage system, the data store's synchronization value using the request's data identifier;
make a determination whether the data store's data identified by the request's data identifier is a direct causal ancestor of data associated with the request, the direct causal ancestor determination being made by comparing the request's synchronization value and data store's synchronization value;
determine whether to permit the at least one data storage system to make the requested data storage operation based on the direct causal ancestor determination and without using versioning information; and
make a determination whether to update the data store's synchronization value in response to the request, and updating the data store's synchronization value in accordance with the update determination.

18. The computer readable non-transitory storage medium of claim 17, further comprising:
the request's data storage operation comprising an update operation to overwrite at least one data value of the data store's data with at least one updated data value of the request, the request's synchronization value comprising a synchronization value for the request's at least one updated data value and a synchronization base value for the direct causal ancestor of the request's at least one updated data value, the direct causal ancestor determination further comprising instructions to:
compare the request's synchronization base value with the data store's synchronization value to make a determination whether or not the at least one data value of the data store's data identified by the request's data identifier is the direct causal ancestor of the request's at least one updated data value; and
if the at least one data value of the data store's data identified by the request's data identifier is determined to be the direct causal ancestor of the request's at least one updated data value, the instructions to determine whether to permit the requested data storage operation further comprising instructions to:
permit the at least one data storage system to use the request's at least one updated data value to overwrite the data store's at least one data value; and
cause the request's synchronization value to overwrite the data store's synchronization value.

19. The computer readable non-transitory storage medium of claim 18, further comprising:
if the at least one data value of the data store's data identified by the request's data identifier is determined not to be the direct causal ancestor of the request's at least one updated data value, the instructions determine whether to permit the requested data storage operation further comprising instructions to:
provide a response to the request indicating that a conflict exists, the response comprising the data store's at least one data value identified by the request's data identifier for resolution by the requester.

20. The computer readable non-transitory storage medium of claim 18, the request's synchronization value comprising a hash generated using the request's at least one updated data value, the request's synchronization base value comprising a hash generated using at least one data value of the direct causal ancestor of the request's at least one updated data value, and the data store's synchronization value comprising a hash generated using the data store's at least one data value.

21. The computer readable non-transitory storage medium of claim 18, the data store's at least one data value and the request's at least one updated data value each comprising a data value and metadata associated with the data value.

22. The computer readable non-transitory storage medium of claim 17, further comprising:
the request's data storage operation comprising a read operation to read at least one data value of the data store's data requested by the request, the request's synchronization value comprising a synchronization value for the request, the direct causal ancestor determination further comprising instructions to:
compare the request's synchronization value with the data store's synchronization value to make a determination whether or not the requested at least one data value is different from the at least one data value of the data store's data; and
if the requested at least one data value is determined to be different from the at least one data value of the data store's data, the instructions to determine whether to permit the requested data storage operation further comprising instructions to:
permit the at least one data storage system to read the at least one data value of the data store's data; and
provide a response comprising the at least one data value of the data store's data and the data store's synchronization value associated with the at least one data value of the data store's data.

23. The computer readable non-transitory storage medium of claim 22, the request's synchronization value comprising a hash generated using at least one data value associated with the request and the data store's synchronization value comprising a hash generated using the data store's at least one data value.

24. The computer readable non-transitory storage medium of claim 22, the requested at least one data value comprising a data value and metadata associated with the data value.

* * * * *